(12) United States Patent
Chen et al.

(10) Patent No.: US 11,681,111 B2
(45) Date of Patent: Jun. 20, 2023

(54) CONNECTOR, AND OPTICAL MODULE

(71) Applicant: HISENSE BROADBAND MULTIMEDIA TECHNOLOGIES CO., LTD., Shandong (CN)

(72) Inventors: Jinlei Chen, Shandong (CN); Yinlong Liu, Shandong (CN); Baofeng Si, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 169 days.

(21) Appl. No.: 16/880,358

(22) Filed: May 21, 2020

(65) Prior Publication Data

US 2020/0278505 A1  Sep. 3, 2020

Related U.S. Application Data

(63) Continuation of application No. PCT/CN2019/106805, filed on Sep. 19, 2019.

(30) Foreign Application Priority Data

Sep. 19, 2018  (CN) .......................... 201811094172.4

(51) Int. Cl.
   *G02B 6/36*  (2006.01)
   *G02B 6/42*  (2006.01)
   *G02B 6/38*  (2006.01)
(52) U.S. Cl.
   CPC .........  *G02B 6/4292* (2013.01); *G02B 6/3897* (2013.01)

(58) Field of Classification Search
   CPC .. G02B 6/3887; G02B 6/3897; G02B 6/4292; G02B 6/3822; G02B 6/389
   See application file for complete search history.

(56) References Cited

U.S. PATENT DOCUMENTS 5,191,632 A * 3/1993 Mansfield ............ G02B 6/3802
   385/136
5,375,185 A * 12/1994 Hermsen .............. G02B 6/4454
   385/135

(Continued)

FOREIGN PATENT DOCUMENTS

CN      1612424 A      5/2005
CN    201845117 U      5/2011

(Continued)

OTHER PUBLICATIONS

Chinese Office Action and Search Report with English translation regarding Appl. No. 201811094172.4, dated Apr. 22, 2019, 17 pages.

(Continued)

*Primary Examiner* — Jennifer Doan
(74) *Attorney, Agent, or Firm* — Workman Nydegger

(57) ABSTRACT

The present disclosure describes embodiments of a connector and an optical module, pertaining to the technical field of optoelectronic devices. The connector includes a substrate provided with a through-hole passing through the substrate from a first board surface to a second board surface thereof. The second board surface faces opposite from the first board surface. The first board surface is provided with a first groove and a second groove, and the first groove and the second groove respectively are configured to adapt to different optical fiber splices.

20 Claims, 10 Drawing Sheets

(56) References Cited

U.S. PATENT DOCUMENTS

| | | | | |
|---|---|---|---|---|
| 6,599,032 | B1* | 7/2003 | Kurashima | G02B 6/4249 385/24 |
| 2005/0069263 | A1* | 3/2005 | Onogawa | G02B 6/3825 385/55 |
| 2005/0094943 | A1* | 5/2005 | Kobayashi | G02B 6/389 385/55 |
| 2005/0185894 | A1 | 8/2005 | Khor | |
| 2019/0049678 | A1* | 2/2019 | Koreeda | G02B 6/3817 |

FOREIGN PATENT DOCUMENTS

| | | |
|---|---|---|
| CN | 202372669 U | 12/2011 |
| CN | 105301705 A | 2/2016 |
| CN | 106646774 A | 5/2017 |
| CN | 207780311 U | 8/2018 |
| CN | 108983367 A | 12/2018 |
| JP | 2005134822 A | 5/2005 |
| WO | WO2017131717 A1 | 8/2017 |

OTHER PUBLICATIONS

International Search report with English translation regarding Appl. No PCT/CN2019/106805 dated Dec. 18, 2019, 6 pages.

* cited by examiner

CONNECTOR, AND OPTICAL MODULE

CROSS-REFERENCE TO RELATED APPLICATIONS

This application is a continuation application of International Application No. PCT/CN2019/106805, filed Sep. 19, 2019, which claims priority to Chinese Patent Application No. 201811094172.4, filed Sep. 19, 2018, both of which are hereby incorporated by reference in their entireties.

FIELD

The present disclosure relates to the technical field of photoelectricity, and more particularly relates to a connector and an optical module.

BACKGROUND

An optical module is widely applied in an optical fiber communication system, and mainly includes: a photoelectronic device, a functional circuit and an optical interface. The optical interface is used for connecting a physical interface of an external optical connector.

SUMMARY

Some embodiments of the present disclosure provide a connector disposed at an optical interface of an optical module. The connector includes a substrate including a first plate surface and a second plate surface that are opposite to each other; a through hole penetrating through the substrate; and a first groove and a second groove formed in the first plate surface, and respectively configured to adapt to different optical fiber splices.

Some embodiments of the present disclosure provide a connector disposed at an optical interface of an optical module. The connector includes a substrate including a first plate surface and a second plate surface that are opposite to each other; a through hole penetrating through the substrate; and a groove formed in the first plate surface, and configured to adapt to different optical fiber splices.

DETAILED DESCRIPTION OF THE EMBODIMENTS

In order to make those skilled in the art better understand the technical solutions of the present disclosure, the embodiments of the present disclosure are described in detail below with reference to the accompanying drawings of this description.

Some embodiments of the present disclosure provide a connector, arranged at an optical interface of an optical module. The optical module includes a housing, a circuit board component located in the housing, and an optical fiber splice. A locating ring is arranged at a periphery of the optical fiber splice. The connector is abutted against the locating ring, and is configured to locate the optical fiber splice inserted into the optical module and also configured to be clamped with an external connector. The connector includes a substrate. A through hole penetrating through a first plate surface and a second plate surface of the substrate is formed in the substrate. The second plate surface is opposite to the first plate surface. A first groove and a second groove are formed in the first plate surface, and are respectively configured to adapt to different optical fiber splices.

Figure 1:
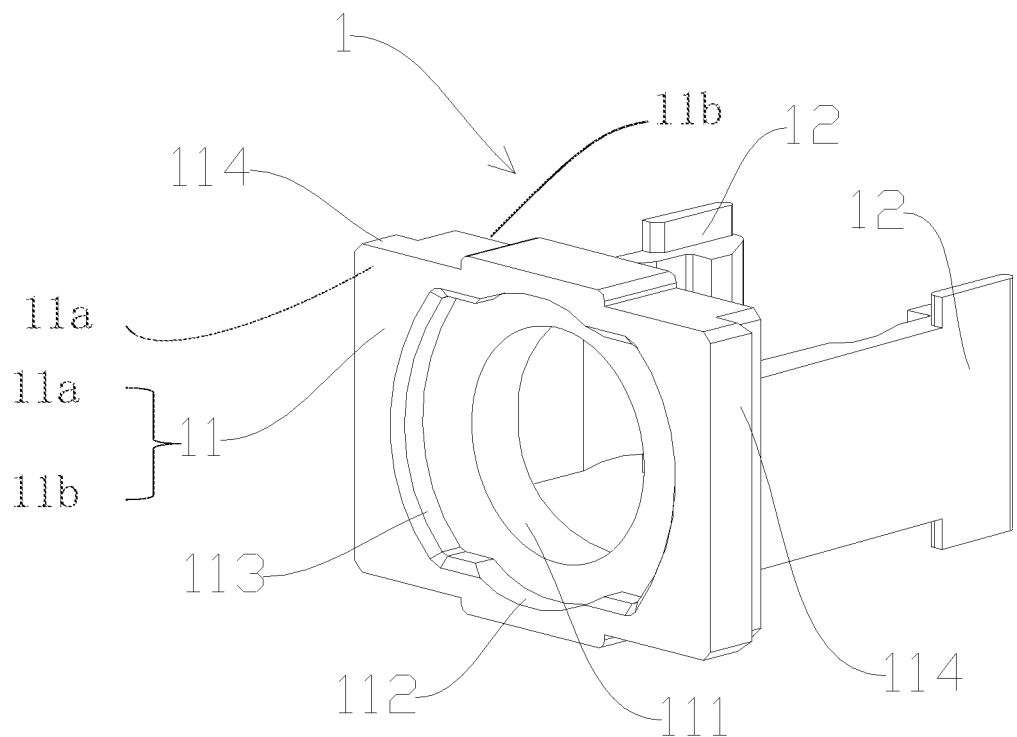
FIG. 1 is a schematic structural diagram of a connector of an embodiment of the present disclosure from a first viewing angle.
Figure 3:
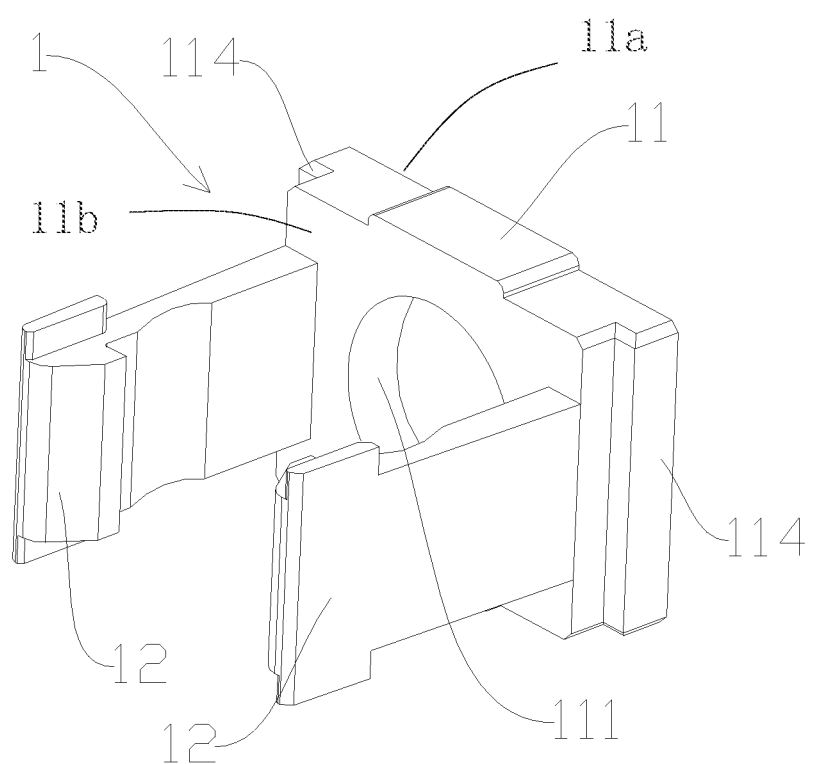
FIG. 3 is a schematic structural diagram of a connector of an embodiment of the present disclosure from a second viewing angle.
Figure 4:
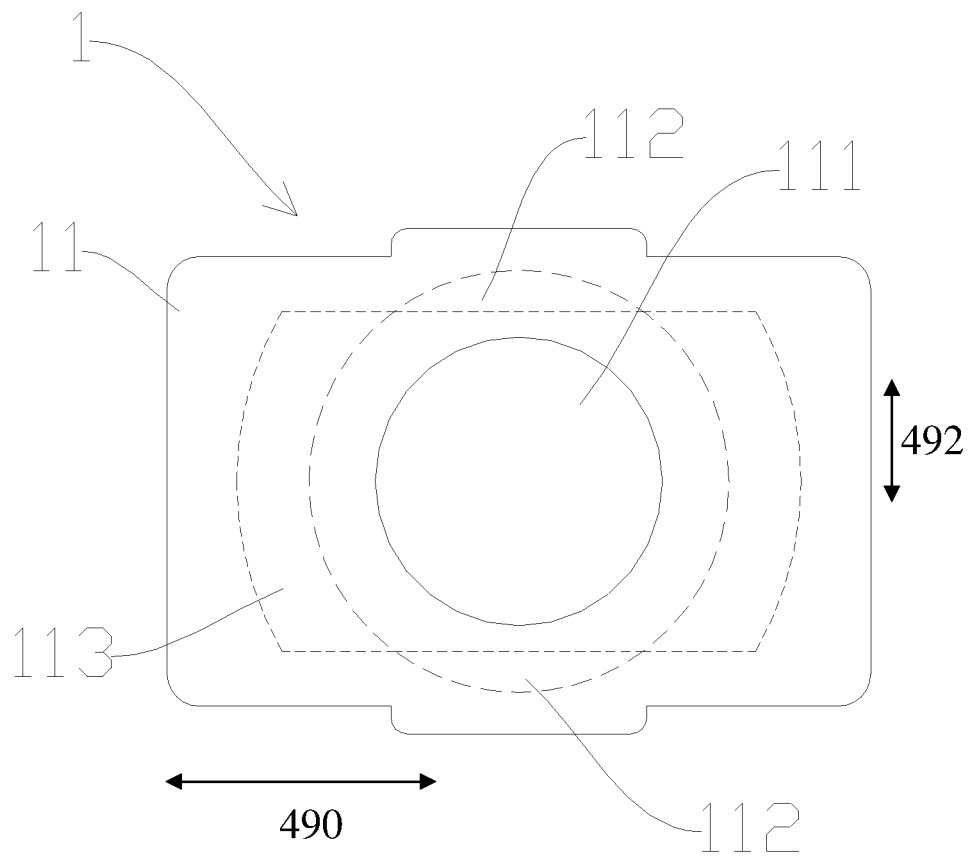
FIG. 4 is a schematic structural diagram of a connector of an embodiment of the present disclosure from a third viewing angle.

In some embodiments, as shown in FIG. 1, FIG. 3 and FIG. 4, the connector 1 includes the substrate 11, and also includes clamping jaws 12. The substrate 11 has the first plate surface 11a and the second plate surface 11b. The second plate surface 11b is opposite to the first plate surface 11a. The through hole 111 penetrating through the first plate surface 11a and the second plate surface 11b is formed in the substrate 111. The second plate surface is opposite to the first plate surface. The clamping jaws 12 are located on the second plate surface 11b, and extend along a direction perpendicular to the second plate surface 11b. The first groove 112 and the second groove 113 which are coaxial with the through hole 111 are formed in the first plate surface 11a of the substrate 11. That is, the first groove 112 and the second groove 113 overlap the geometrical center of the through hole 111.

In some embodiments, the bottom surface (the surface at the groove bottom) of the first groove 112 and the bottom surface (the surface at the groove bottom) of the second groove 113 are located on a same plane, and the first groove 112 and the second groove 113 partially overlap.

In some embodiments, the bottom surface (the surface at the groove bottom) of the first groove 112 and the bottom surface (the surface at the groove bottom) of the second groove 113 are not located on the same plane.

In some embodiments, orthogonal projections of symmetry axes of the first groove 112 and the second groove 113, which are parallel to the substrate, on the substrate overlap one or more orthogonal projections of one or more of symmetry axes of the through hole, which are parallel to the substrate, on the substrate. The first groove 112 and the second groove 113 partially overlap, and are different in shape. Different types of optical fiber splices may be matched with the first groove 112 or the second groove 113, respectively, and optical fibers may be inserted into the through hole 111, so as to locate (fix) the optical fiber splices and fix the optical fibers. Therefore, the connector 1 may simultaneously adapt to different types of optical fiber splices, for example but not limited to an Ultra Physical Contact (UPC) type or an Angled Physical Contact (APC) type, thereby greatly reducing the manufacturing cost of a product. Meanwhile, in an assembling process, the assembling difficulty may be greatly reduced, and the assembling efficiency is improved. In some embodiments of the present disclosure, the first groove 112 is configured to adapt to a UPC type optical fiber splice, and the second groove 113 is configured to adapt to an APC type optical fiber splice.

In some embodiments of the present disclosure, it can be known from FIG. 1 and FIG. 4 that the first groove 112 and the second groove 113 partially (partial regions surrounding the through hole 111) overlap, which specifically means that the first groove 112 and the second groove 113 partially overlap in a thickness direction of the substrate 11. Since the size of the second groove 113 in a lengthwise direction 490 is greater than the diameter of the first groove 112, and the size of the second groove 113 in a width direction 492 is less than the diameter of the first groove 112, a partial region of the first groove 112 overlaps and is covered by the second groove 113. Therefore, only a part of the arc of the first groove 112 may be displayed in the figure. From this, non-overlapping portions of the first groove 112 and/or the second groove 113 respectively engage with the end surfaces of the different types of optical fiber splice to support the optical fiber splices. Here, "to engage" refers to make contact and to support.

Figure 2:
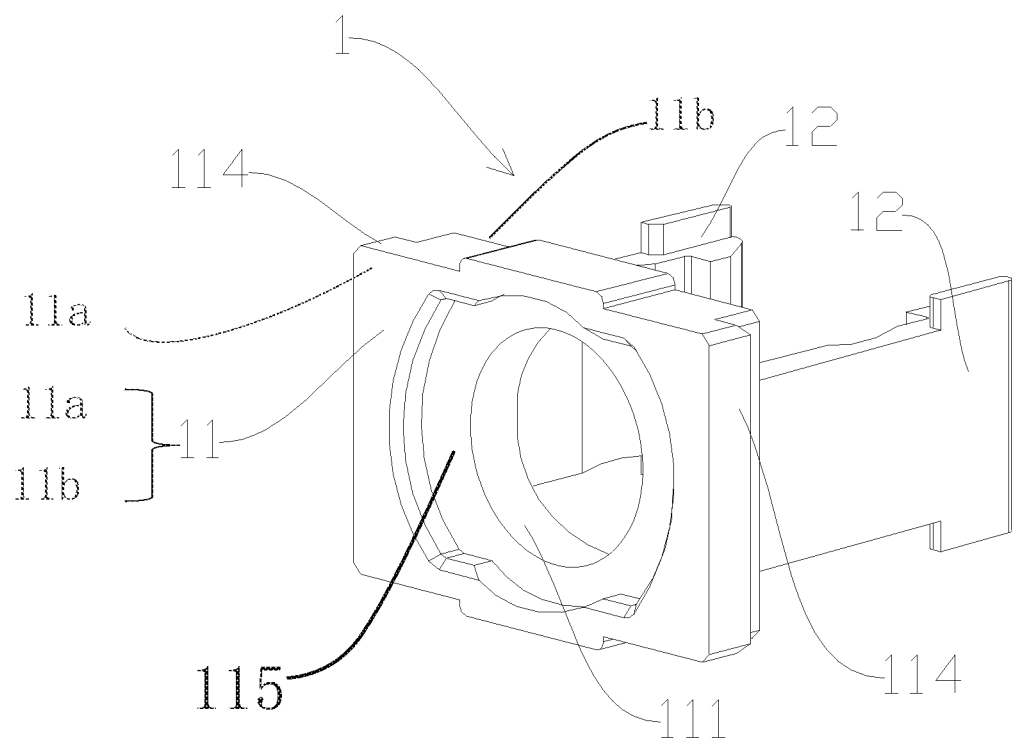
FIG. 2 is a schematic structural diagram of another connector of an embodiment of the present disclosure from a first viewing angle.

In some embodiments, the connector 1 is provided with two clamping jaws 12 symmetrically arranged in a long edge direction of the substrate relative to the center of the through hole 111, as shown in FIGS. 1, 2 and 3.

In some embodiments, the first groove is cylindrical, and the second groove has a group of arc-shaped inner walls in a short edge direction of the substrate and a group of straight line-shaped inner walls in the long edge direction of the substrate.

Figure 5:
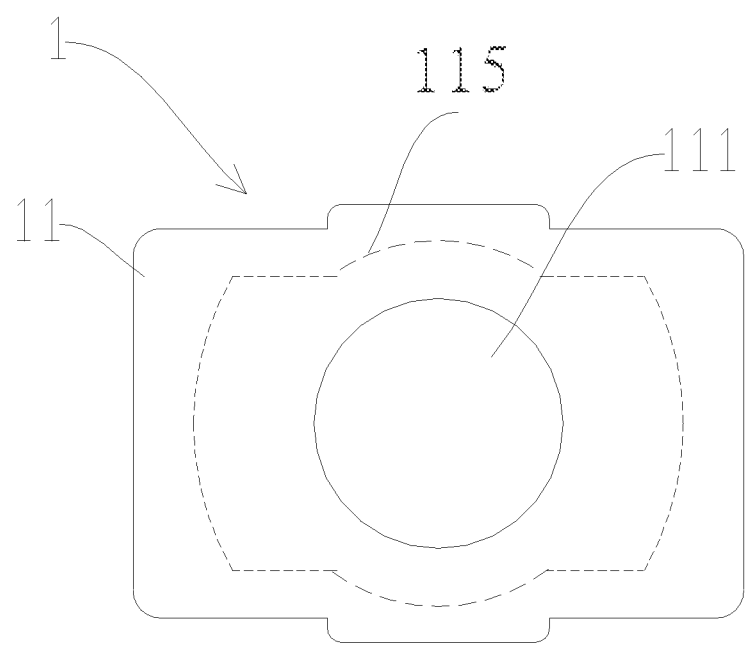
FIG. 5 is a schematic structural diagram of another connector of an embodiment of the present disclosure from a third viewing angle.

The overall structure of the connector 1 is as shown in FIG. 2, and a cross section is as shown in FIG. 5. A groove 115 is formed in the first plate surface. The cross-sectional shape of the groove 115 may simultaneously adapt to the different types of optical fiber splices of the optical module (illustration is made by taking the UPC type optical fiber splice and the APC type optical fiber splice for example. During specific application, other two inconsistent types of optical fiber splices may also be used).

Substantially, the first groove 112 and the second groove 113 are not obviously distinguished, and they form the integrated groove 115 to adapt to different types of optical fiber splices. An orthogonal projection of a symmetry axis of the groove 115, which is parallel to the substrate, on the substrate overlaps an orthogonal projection or orthogonal projections of one or more of symmetry axes of the through hole, which are parallel to the substrate, on the substrate.

In some embodiments, the groove 15 has a group of arc-shaped inner walls in the short edge direction of the substrate, and a group of curved inner walls in the long edge direction of the substrate. The curved inner walls include straight line portions and arc portions. The straight line portions are connected with the arc-shaped inner walls, and the arc portions are connected with the straight line portions. The through hole is cylindrical, and a circle center axis corresponding to the arc portions overlaps the circle center axis of the through hole.

Some embodiments of the present disclosure provide an optical module, including a housing, a circuit board component located in the housing, and an optical fiber splice. A connector is fixed in the housing. A locating ring is arranged at a periphery of the optical fiber splice. The optical fiber splice is arranged in the through hole on the substrate in a penetrating manner, and the locating ring is located in the groove. The periphery of the locating ring is circular, and is abutted against the arc portions of the curved inner walls of the groove in the long edge direction of the substrate.

Some embodiments of the present disclosure provide another optical module, including a housing, a circuit board component located in the housing, and an optical fiber splice. A connector is fixed in the housing. A locating ring is arranged at a periphery of the optical fiber splice. The optical fiber splice is arranged in the through hole on the substrate in a penetrating manner, and the locating ring is located in the groove. The periphery of the locating ring includes a group of arc-shaped outer walls abutted against the arc-shaped inner walls of the groove in the short edge direction of the substrate.

The cross section of the groove 115 may have a certain shape. The cross section shape has a group of arc-shaped edges in the short edge direction of the substrate, and a group of curved edges in the long edge direction of the substrate. The curved edges include straight line portions and arc portions. The straight line portions are connected with the arc-shaped edges of the cross section shape. The arc portions are connected with the straight line portions, and an orthogonal projection of a circle center corresponding to the arc portions on the substrate overlaps an orthogonal projection of the circle center of the circular cross section of the through hole on the substrate.

In the above embodiment, the orthogonal projection on the substrate refers to an orthogonal projection on the first plate surface or the second plate surface of the substrate.

Some embodiments of the present disclosure provide an optical module, including a housing, a circuit board component located in the housing, and an optical fiber splice. A connector is fixed in the housing. A locating ring is arranged at a periphery of the optical fiber splice. The optical fiber splice is at least partially arranged in the through hole on the substrate in a penetrating manner, and the locating ring is located in the first groove or the second groove. The outer contours of some locating rings are circular, and the periphery of each locating ring is abutted against the inner wall of the first groove. The outer contours of some locating rings include a group of arc-shaped outer walls, and the periphery of each locating ring is abutted against the inner walls of the second groove.

In some embodiments, as shown in FIG. 9 to FIG. 12, a circular-ring-shaped locating ring is arranged on the UPC type optical fiber splice. The first groove 112 is configured to adapt to the UPC type optical fiber splice. That is, the corresponding arc portions of the groove 115 in the long edge direction of the substrate are configured to adapt to the UPC type optical fiber splice, and a distance between each of the corresponding arc portions of the groove 115 in the long edge direction of the substrate and the circle center of the through hole 111 is basically equal to the radius of the locating ring of the UPC type optical fiber splice, so as to realize that the arc portions urge the end surface of the UPC type optical fiber splice to support and locate the optical fiber splice. This cross section refers to a cross section obtained by cutting the plane of the first plate surface or the second plate surface.

A group of quadrangular locating rings with arc-shaped opposite edges are arranged on the APC type optical fiber splice. The second groove 113 is configured to adapt to the APC type optical fiber splice. That is, a maximum distance between the opposite edges of the corresponding arc portions of the groove 115 in the short edge direction of the substrate may be basically equal to a maximum distance between the arc-shaped opposite edges of the APC type optical fiber splice. The opposite edges of the corresponding arc portions of the groove 115 in the short edge direction of the substrate are matched with the arc-shaped opposite edges of the APC type optical fiber splice, so as to realize that the arc portions urge the end surface of the APC type optical fiber splice to support and locate the optical fiber splice.

In some embodiments of the present disclosure, the connector 1 may be of an integrated structure.

In some embodiments of the present disclosure, the connector may also be of a structure formed by combining the formed substrate 11 and clamping jaws 12. Those skilled in the art may reasonably select a forming mode of the connector according to an actual requirement, and the present disclosure does not make specific limitations to this.

Figure 6:
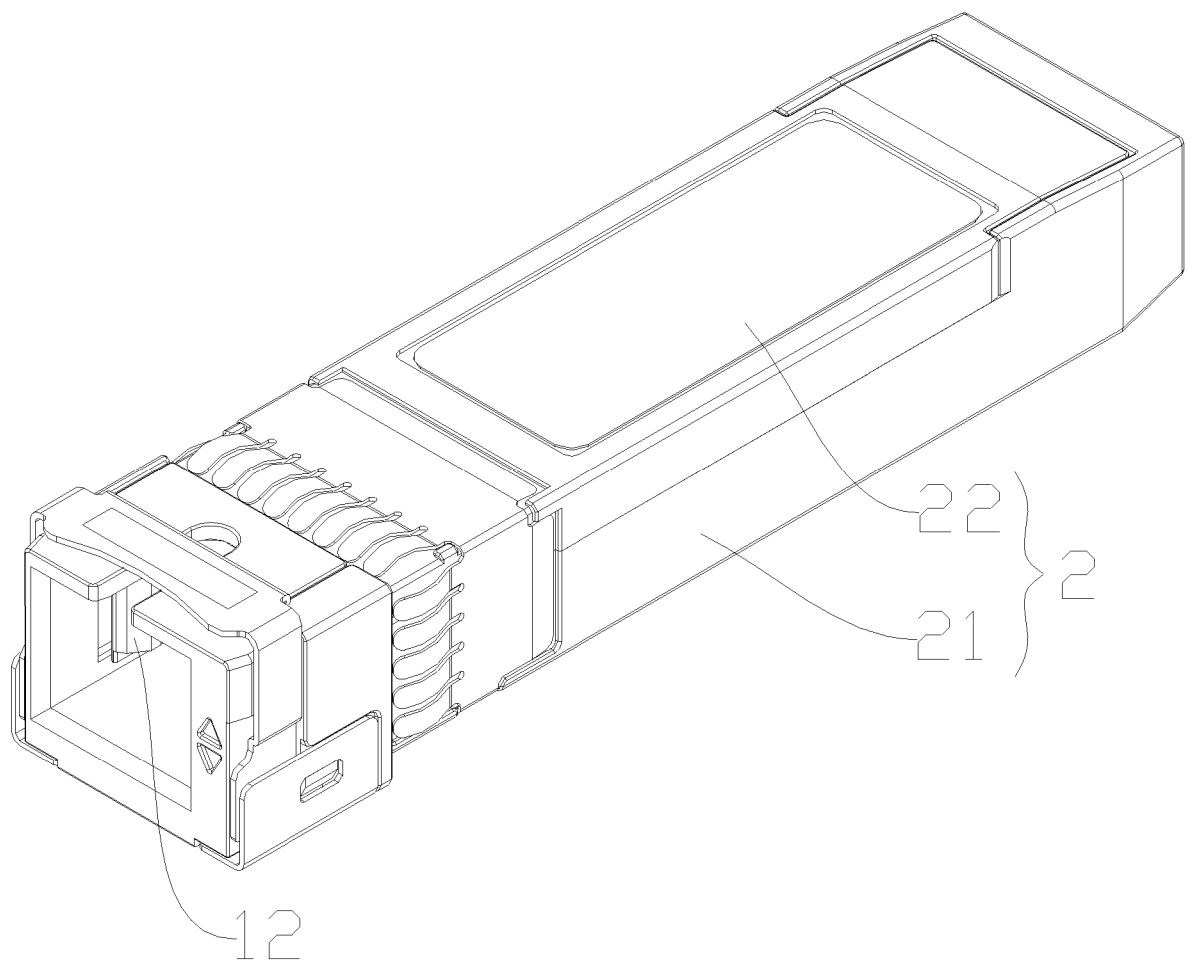
FIG. 6 is a schematic structural diagram of an optical module according to Embodiment I of the present disclosure.
Figure 7:
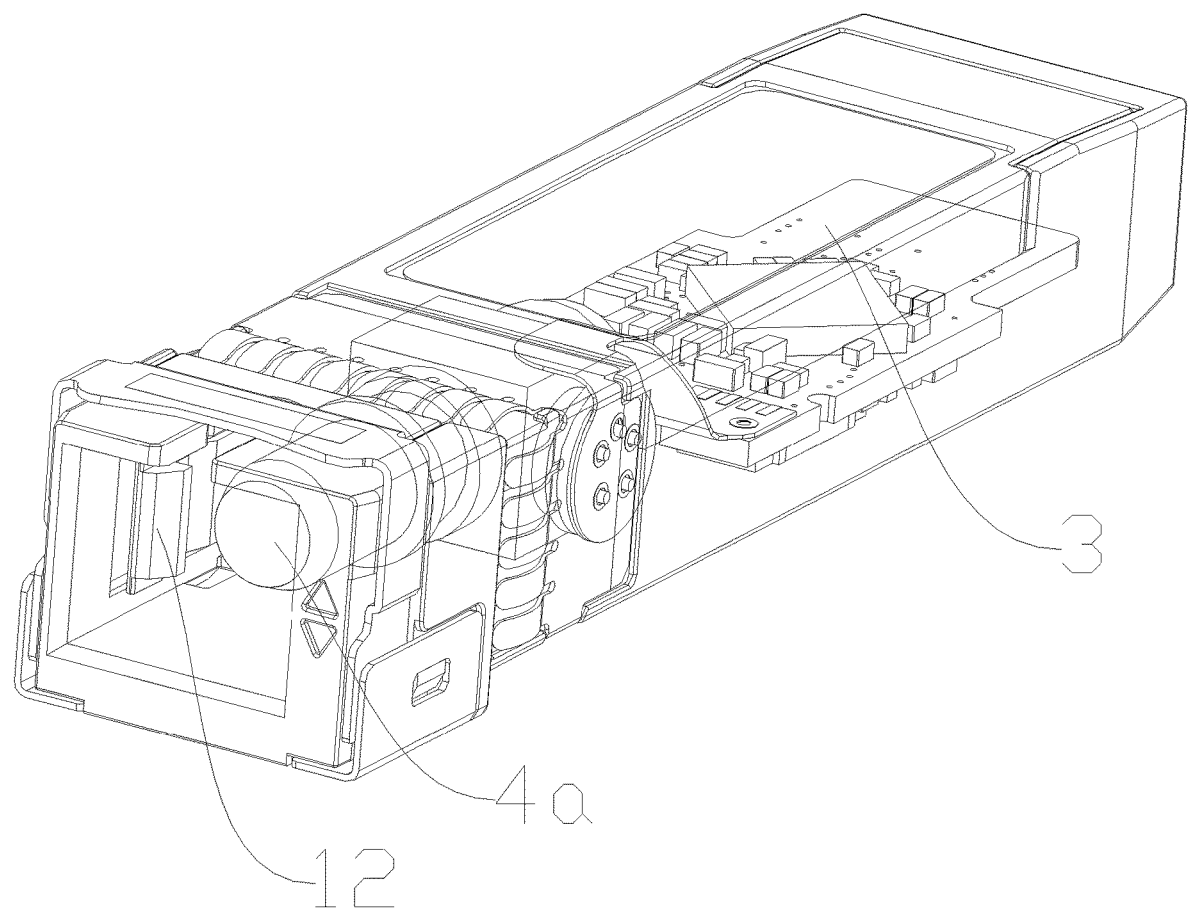
FIG. 7 is a perspective diagram of the optical module according to some embodiments of the present disclosure.
Figure 8:
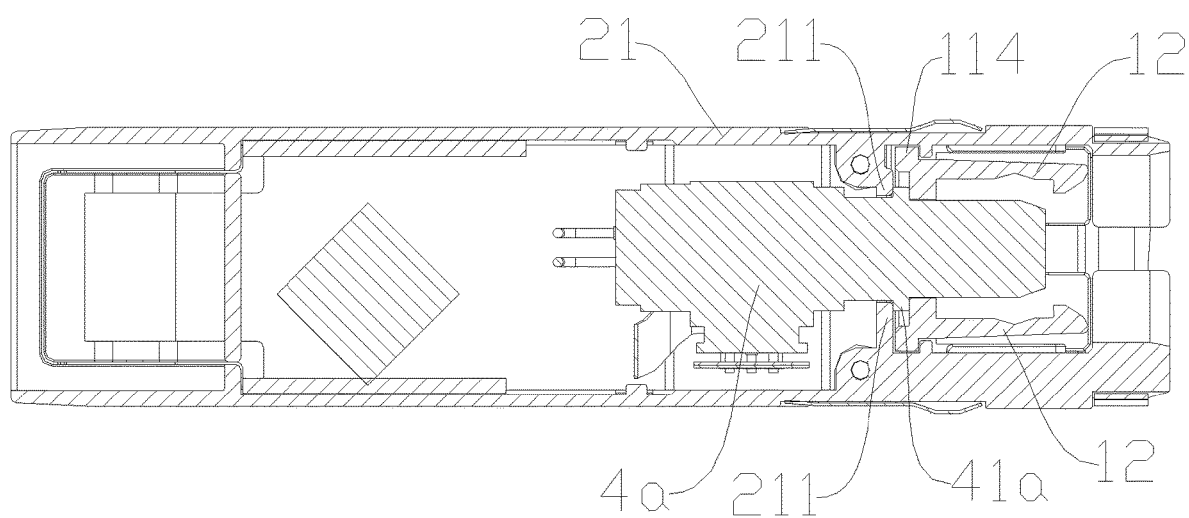
FIG. 8 is a cutaway diagram of the optical module according to some embodiments of the present disclosure.
Figure 9:
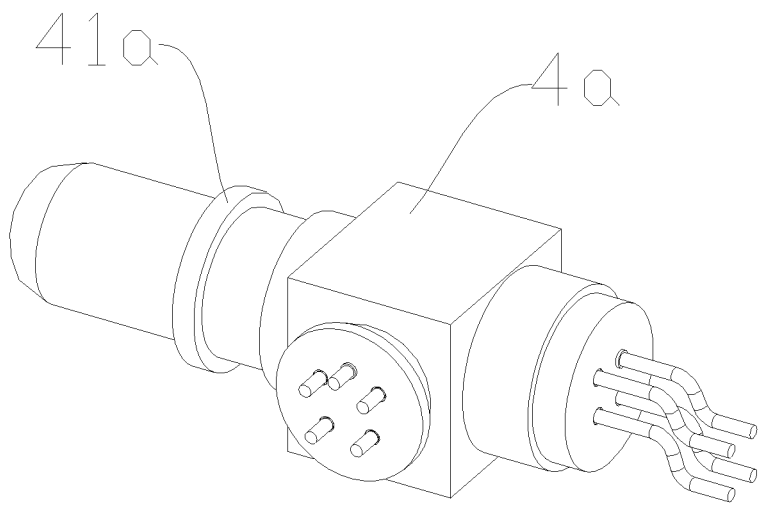
FIG. 9 is a schematic structural diagram of an optical fiber splice of the optical module according to some embodiments of the present disclosure.
Figure 10:
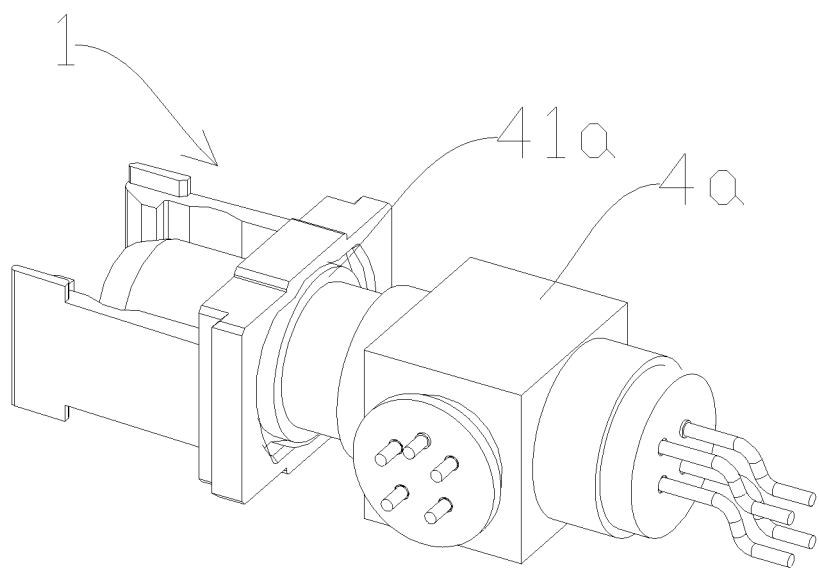
FIG. 10 is a schematic structural diagram of cooperation between the optical fiber splice of the optical module according to some embodiments of the present disclosure and a connector.
Figure 11:
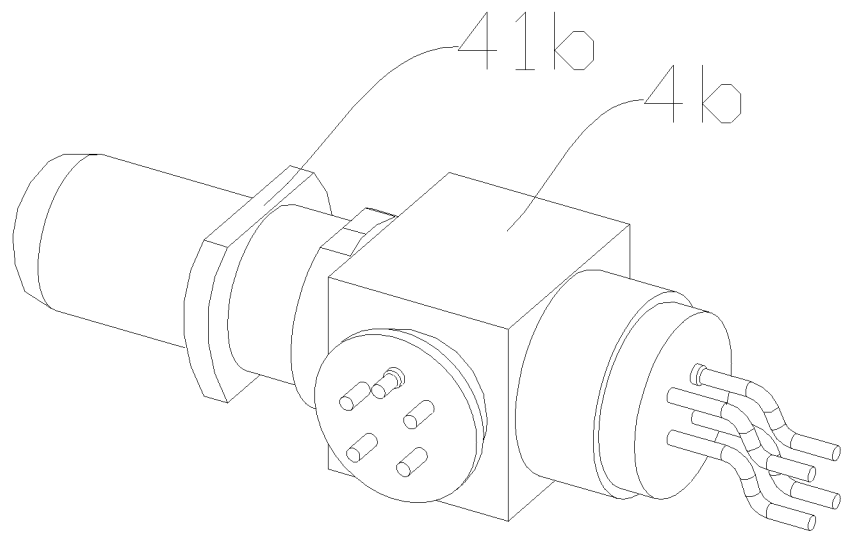
FIG. 11 is a schematic structural diagram of an optical fiber splice of an optical module according to some embodiments of the present disclosure.
Figure 12:
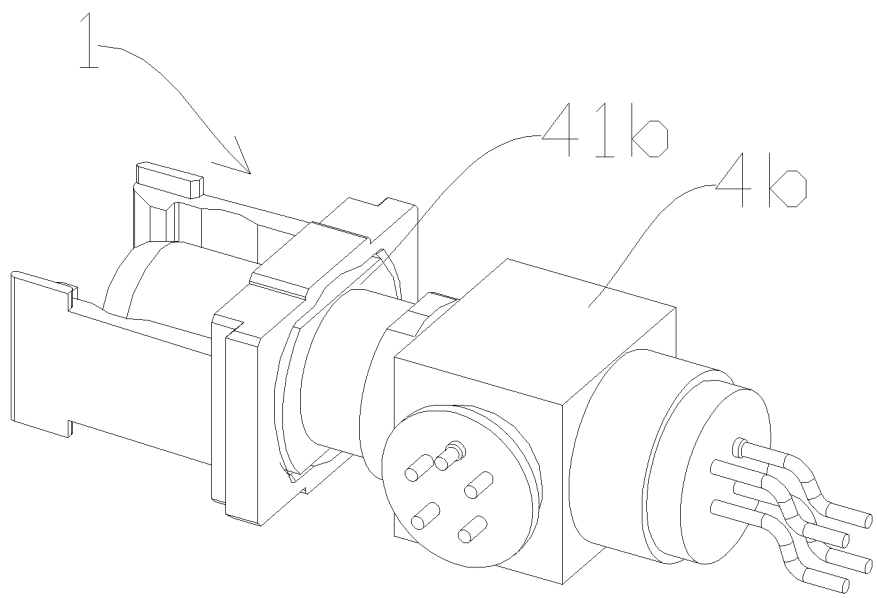
FIG. 12 is a schematic structural diagram of cooperation between the optical fiber splice of the optical module according to some embodiments of the present disclosure and a connector.

In addition, the embodiment of the present disclosure further provides an optical module, as shown in FIG. 6 to FIG. 8. The optical module includes a housing 2, a circuit board component 3 located in the housing 2, an optical fiber splice and the foregoing connector 1. The connector 1 is fixed in the housing 2. A locating ring (referring to FIG. 9 to FIG. 12) is arranged at a periphery of the optical fiber splice. The optical fiber splice is arranged in the through hole 111 on the substrate 11 in a penetrating manner. The locating ring is located in the first groove 112 or the second groove 113. That is, it is selectively located at different portions of the groove 115.

In some embodiments, the housing 2 of the optical module is of a rectangular long-strip structure, and one end in the lengthwise direction is provided with an insertion portion (not shown in the figure) connected with an external connector. The connector 1 is arranged at the insertion port.

In some embodiments, the housing 2 includes a base 21 and an upper cover 22 fastened with each other. A flange 211 is arranged on the inner wall of the base 21, and is located on one side of the first plate surface of the substrate 11.

In some embodiments, the locating ring 41*a* is located between the flange 211 and the first groove 112 as well as the second groove 113, i.e., between the flange 211 and the groove 115.

In some embodiments, the locating ring 41*a* is located between the flange 211 and the first groove 112, i.e., between the flange 211 and the groove 115.

In some embodiments, sliding slots (not shown in the figure) perpendicular to the lengthwise direction of the base 21 are formed in the base 21. Protrusions 114 are arranged on the connector 1, and slide into the sliding slots to limit the movement of the connector 1 in the lengthwise direction of the housing 2.

In some embodiments, two sliding slots are vertically disposed oppositely. The protrusions 114 are portions of the first plate surface, which protrude from the second plate surface, and are located on the side walls of the connector 1. Each side wall is a side surface between the first plate surface and the second plate surface of the substrate 11, and the protrusions 114 are arranged on the two opposite side walls. During specific assembling, the connector 1 may downwards slide from a position above the base 21, and at the same time, the protrusions 114 slide into the sliding slots to limit the movement of the connector 1 in the lengthwise direction of the housing 2 (the base 21), and to also avoid the rotation of the connector 1 relative to the base 21, so as to finally locate the connector 1 onto the base 21 through the upper cover 22 or other components to prevent the connector 1 from sliding out of the base 21.

In actual application of the optical module, almost all the optical interfaces (over 90 percent) use Square Connector (SC) type optical interfaces, and the SC type optical interfaces are classified into an Angled Physical Contact (APC) type and an Ultra Physical Contact (UPC) type according to the shapes of the contact pin end surfaces of optical fiber splices. The optical fiber end surface of an (UPC type) optical fiber splice in the UPC type optical interface is a vertical plane. Therefore, it is necessary to locate a relative position between the (UPC type) optical fiber splice and the optical interface. The optical fiber end surface of an optical fiber splice in the APC type optical interface is an 8-degree slope, so that it is necessary not only to locate a relative position between the (APC type) optical fiber splice and the optical interface, but also to accurately locate a circumferential angle of the (APC type) optical fiber splice (contact pin) to satisfy light coupling in an 8-degree optical fiber end surface.

In some embodiments, the optical fiber splice 4*a* is of the UPC type, i.e., the outer contour of the locating ring 41*a* of the optical fiber splice 4*a* is circular. The optical fiber splice 4*a* penetrates into the through hole 111 through the first plate surface 11*a* of the substrate 11 of the connector 1, and one side of the locating ring 41*a* is abutted against the bottom surface of the first groove 112, i.e., this side is abutted against a part of the bottom surface of the groove 115, so as to limit the optical fiber splice in an axial direction. Meanwhile, all or a part of the periphery of the locating ring 41*a* is abutted against all or a part of the inner walls of the first groove 112; or all or a part of the periphery of the locating ring 41*a* has a gap from all or a part of the inner walls of the first groove 112. The inner walls of the first groove 112 support the locating ring 41*a*. That is, all or the part of the periphery of the locating ring 41*a* may engage or urge the inner walls of the arc portions of the groove 115 in the long edge direction of the substrate, and the arc portions of the groove 115 in the long edge direction of the substrate support the locating ring 41*a*. Since the contact pin end surface of the UPC type optical fiber splice is the straight plane, when the UPC type optical fiber splice is abutted with an external (UPC type) connector, there is no need to consider the problem of the rotation angle of the optical fiber splice. Therefore, it is only necessary to locate the radial direction and the axial direction of the optical fiber splice 4*a* (i.e., the position accuracy is guaranteed, while the movement of the optical fiber splice 4*a* needs to be prevented).

As shown in FIG. 6 to FIG. 8, and FIG. 10 to FIG. 12, the housing 2 of the optical module is of a rectangular long-strip structure, and one end in the lengthwise direction is provided with an insertion portion connected with the external connector. The connector 1 is arranged at the insertion port. For the APC type optical fiber splice, the outer contour of the locating ring 41*b* of the optical fiber splice 4*b* is a quadrangle having a group of arc-shaped opposite edges. The optical fiber splice 4*b* penetrates into the through hole 111 through the first plate surface 11*a* of the substrate 11 of the connector 1, and one side of the locating ring 41*a* is abutted against the bottom surface of the second groove 113, or is abutted against a part of the bottom surface of the groove 115. Meanwhile, all or a part of the periphery of the locating ring 41b is abutted against all or a part of the inner walls of the second groove 113 (such as the inner walls corresponding to the arc-shaped opposite edges of the second groove 113 and the inner walls corresponding to the straight line portions of the curved edges). That is, all or the part of the periphery of the locating ring 41b may also engage or urge the arc-shaped inner walls of the groove 115 in the short edge direction of the substrate and the inner walls corresponding to the straight line portions in the long edge direction of the substrate. Since the contact pin end surface of the APC type optical fiber splice 4b is the 8-degree slope, when the APC type optical fiber splice is abutted with an external (APC type) connector, it is necessary to consider the problem of the rotation angle of the optical fiber splice 4b. Therefore, it is necessary not only to locate the radial direction and the axial direction of the optical fiber splice 4b, but also to locate the axial direction (the rotation angle) of the optical fiber splice 4b (i.e., the position accuracy is guaranteed, while it is necessary not only to prevent the movement of the optical fiber splice 4b, but also to prevent the rotation of the optical fiber splice 4b when the plane of the inner walls of the second sunk 113, or the plane of the inner walls of the groove 115 is abutted against the plane of the periphery of the locating ring 41b).

Obviously, those skilled in the art can make various changes and modifications to the present disclosure without departing from the spirit and scope of the present disclosure. Therefore, if these changes and modifications of the present disclosure fall within the scope of the claims of the present disclosure and equivalent technologies of the present disclosure, the present disclosure is intended to include these changes and modifications.

What is claimed is:

1. A connector disposed at an optical interface of an optical module, comprising:
   a substrate comprising a first plate surface and a second plate surface that are opposite to each other;
   a through hole penetrating through the substrate; and
   a first groove and a second groove formed in the first plate surface, and respectively configured to adapt to different shapes optical fiber splices.

2. The connector according to claim 1, wherein bottom surfaces of the first groove and the second groove are on a same plane, and the first groove partially overlap with the second groove.

3. The connector according to claim 1, wherein: orthogonal projections of symmetry axes of the first groove and the second groove on the substrate overlap one or more orthogonal projections of one or more symmetry axes of the through hole on the substrate, wherein the symmetry axes of the first groove and the second groove parallel to the substrate; the one or more of symmetry axes of the through hole are parallel to the substrate.

4. The connector according to claim 3, wherein: the first groove is cylindrical, and the second groove has a group of arc-shaped inner walls in a short edge direction of the substrate and a group of straight line-shaped inner walls in a long edge direction of the substrate.

5. The connector according to claim 1, further comprising: two clamping jaws symmetrically disposed on a long edge direction of the substrate relative to a center of the through hole.

6. An optical module, comprising:
   a housing;
   a circuit board component disposed in the housing; an optical fiber splice;
   the connector according to claim 1, wherein:
   the connector is fixed in the housing,
   a locating ring is arranged at a periphery of the optical fiber splice,
   the optical fiber splice at least partially penetrates in the through hole on the substrate, and
   the locating ring is located in the first groove or the second groove.

7. The optical module according to claim 6, wherein: an outer contour of the locating ring is circular, and the periphery of the locating ring is abutted against an inner wall of the first groove.

8. The optical module according to claim 6, wherein: an outer contour of the locating ring comprises a group of arc-shaped outer walls, and the periphery of the locating ring is abutted against inner walls of the second groove.

9. The optical module according to claim 6, wherein:
   an inner wall of the housing is provided with a flange located on one side of the first plate surface of the substrate, and
   the locating ring is located between the flange and the first groove or the second groove.

10. The optical module according to claim 6, wherein:
    the housing is of a rectangular structure, and comprises a base and an upper cover fastened with each other;
    a sliding slot perpendicular to a lengthwise direction of the base is formed in the base; and
    a protrusion is arranged on the connector, and slides into the sliding slot to limit a movement of the connector in a lengthwise direction of the housing.

11. The optical module according to claim 10, wherein:
    the protrusion is located on a side wall of the connector; and
    the side wall is a side surface between the first plate surface and the second plate surface.

12. The optical module according to claim 7, wherein the optical fiber splice is of an Ultra Physical Contact (UPC) type.

13. The optical module according to claim 8, wherein the optical fiber splice is of an Angled Physical Contact (ACP) type.

14. A connector disposed at an optical interface of an optical module, comprising:
    a substrate comprising a first plate surface and a second plate surface that are opposite to each other;
    a through hole penetrating through the substrate; and
    a groove formed in the first plate surface, and configured to adapt to different shapes optical fiber splices.

15. The connector according to claim 14, wherein: an orthogonal projection of a symmetry axis of the groove on the substrate overlaps one or more orthogonal projections of one or more of symmetry axes of the through hole on the substrate, wherein the symmetry axis of the groove is parallel to the substrate; the one or more of symmetry axes of the through hole are parallel to the substrate.

16. The connector according to claim 15, wherein:
    the groove comprises a group of arc-shaped inner walls in a short edge direction of the substrate, and a group of curved inner walls in a long edge direction of the substrate;
    the curved inner walls comprise straight line portions and arc portions;
    the straight line portions are connected with the arc-shaped inner walls, and the arc portions are connected with the straight line portions;

the through hole is cylindrical; and
a circle center axis corresponding to the arc portions overlaps the circle center axis of the through hole.

17. The connector according to claim 14, further comprising:
two clamping jaws symmetrically disposed on a long edge direction of the substrate relative to a center of the through hole.

18. An optical module, comprising:
a housing;
a circuit board component located in the housing; an optical fiber splice; and
the connector according to claim 14, wherein:
the connector is fixed in the housing,
a locating ring is arranged at a periphery of the optical fiber splice,
the optical fiber splice penetrates in the through hole on the substrate, and the locating ring is located in the groove.

19. An optical module, comprising:
a housing;
a circuit board component located in the housing; an optical fiber splice; and
the connector according to claim 16, wherein:
the connector is fixed in the housing,
a locating ring is arranged at a periphery of the optical fiber splice, the optical fiber splice penetrates in the through hole on the substrate, the locating ring is located in the groove,
a periphery of the locating ring is circular, and is abutted against the arc portions of the curved inner walls of the groove in a long edge direction of the substrate.

20. An optical module, comprising:
a housing;
a circuit board component located in the housing; an optical fiber splice; and
the connector according to claim 16, wherein:
the connector is fixed in the housing,
a locating ring is arranged at a periphery of the optical fiber splice, the optical fiber splice penetrates in the through hole on the substrate, the locating ring is located in the groove, and
a periphery of the locating ring comprises a group of arc-shaped outer walls abutted against the arc-shaped inner walls of the groove in the short edge direction of the substrate.

* * * * *